US010680529B2

(12) United States Patent
Kovatchev et al.

(10) Patent No.: US 10,680,529 B2
(45) Date of Patent: Jun. 9, 2020

(54) DC-TO-DC CONVERTER AND METHOD FOR OPERATING A DC-TO-DC CONVERTER

(71) Applicant: CONTINENTAL AUTOMOTIVE GMBH, Hannover (DE)

(72) Inventors: Emil Kovatchev, Vienna (AT); Christian Stoeger, Vienna (AT)

(73) Assignee: Continental Automotive GmbH, Hannover (DE)

( * ) Notice: Subject to any disclaimer, the term of this patent is extended or adjusted under 35 U.S.C. 154(b) by 0 days.

(21) Appl. No.: 16/342,641

(22) PCT Filed: Oct. 11, 2017

(86) PCT No.: PCT/EP2017/075969
§ 371 (c)(1),
(2) Date: Apr. 17, 2019

(87) PCT Pub. No.: WO2018/073076
PCT Pub. Date: Apr. 26, 2018

(65) Prior Publication Data
US 2019/0245454 A1  Aug. 8, 2019

(30) Foreign Application Priority Data
Oct. 17, 2016  (DE) .......... 10 2016 220 199

(51) Int. Cl.
*H02M 3/158* (2006.01)
*H02M 3/335* (2006.01)
(Continued)

(52) U.S. Cl.
CPC ......... *H02M 3/33592* (2013.01); *H02M 1/44* (2013.01); *H02M 3/156* (2013.01); *H02M 3/33507* (2013.01)

(58) Field of Classification Search
CPC .... H02M 3/156; H02M 1/44; H02M 3/33592; H02M 3/33507
(Continued)

(56) References Cited

U.S. PATENT DOCUMENTS 4,929,882 A   5/1990  Szepesi
5,734,259 A   3/1998  Sisson et al.
(Continued)

FOREIGN PATENT DOCUMENTS

CN   102323841 A    1/2012
DE   102014105863 A1  10/2014
(Continued)

OTHER PUBLICATIONS

"A Simple Current-Sense Technique Eliminating a Sense Resistor", Linfinity Microelectronics, AN-7, Jul. 1998, pp. 1-6, Revision 1.1.
(Continued)

*Primary Examiner* — Rajnikant B Patel
(74) *Attorney, Agent, or Firm* — Laurence A. Greenberg; Werner H. Stemer; Ralph E. Locher

(57) ABSTRACT

A method operates a DC-DC voltage converter. A current measurement circuit generates a current signal correlated with a coil current of a coil. A hysteretic switch control system electrically turns off a switch for driving the coil current, if the current signal signals a coil current greater than a peak comparison value, and electrically turns on the switch if the current signal signals a coil current lower than a valley comparison value. An actual value measurement circuit generates an actual value signal correlated with an electrical output variable of the DC-DC voltage converter. A controller unit adjusts the output variable to a prescribed setpoint value and, generates a comparison value signal depending on a control deviation and the switch control system sets an average value of the peak comparison value
(Continued)

and generates the valley comparison value from the comparison value signal.

10 Claims, 4 Drawing Sheets

(51) Int. Cl.
*H02M 3/156* (2006.01)
*H02M 1/44* (2007.01)

(58) Field of Classification Search
USPC ..... 323/222, 271–275, 282–289; 363/16–17, 363/21.01, 97, 98
See application file for complete search history.

(56) References Cited

U.S. PATENT DOCUMENTS

| | | | |
|---|---|---|---|
| 6,979,985 B2 * | 12/2005 | Yoshida | H02M 3/1563 323/282 |
| 7,626,370 B1 | 12/2009 | Mei et al. | |
| 8,525,505 B2 * | 9/2013 | Wang | H02M 1/14 323/286 |
| 8,779,731 B2 | 7/2014 | Menegoli et al. | |
| 8,803,445 B2 * | 8/2014 | Pflaum | H05B 45/37 315/307 |
| 8,957,607 B2 | 2/2015 | Raval et al. | |
| 9,078,319 B2 * | 7/2015 | Hsu | H05B 45/37 |
| 9,385,599 B2 | 7/2016 | Congiu et al. | |
| 2007/0236736 A1 | 10/2007 | Tai et al. | |
| 2008/0067993 A1 | 3/2008 | Coleman | |
| 2012/0176822 A1 * | 7/2012 | Menegoli | H02M 3/156 363/21.18 |
| 2014/0055045 A1 | 2/2014 | Raval et al. | |
| 2016/0204702 A1 * | 7/2016 | Padyana | H02M 1/15 323/271 |

FOREIGN PATENT DOCUMENTS

| | | | |
|---|---|---|---|
| EP | 1603220 A1 * | 12/2005 | ............ H02M 3/156 |
| EP | 1603220 A1 | 12/2005 | |

OTHER PUBLICATIONS

Man Pun Chan, et al., "A Monolithic Digital Ripple-Based Adaptive-Off-Time DC-DC Converter With a Digital Inductor Current Sensor", IEEE Journal of Solid-State Circuits, vol. 49, No. 8, Aug. 2014, pp. 1837-1847.

* cited by examiner

DC-TO-DC CONVERTER AND METHOD FOR OPERATING A DC-TO-DC CONVERTER

BACKGROUND OF THE INVENTION

Field of the Invention

The invention relates to a DC-DC voltage converter in which an electrical output variable, for example the output voltage or the output current, is adjusted to a setpoint value by switching a coil current of a coil. The invention also includes a method for operating the DC-DC voltage converter.

The coil current for adjusting the electrical output variable can be switched by means of hysteretic control (two-point control), that is to say by switching off the coil current if it is greater than a first comparison value, which is referred to here and in the following text as peak comparison value, and by switching the coil current on again when it has decreased to the extent that it is lower than a second comparison value, which is referred to here and in the following text as valley comparison value. A further name for the peak comparison value is upper threshold value and a further name for the valley comparison value is lower threshold value In general, the greatest permissible current intensity is set as the peak comparison value (peak-current mode control). This is described, for example, in U.S. Pat. No. 7,626,370 B1.

A further hysteretic controller for the coil current of a DC-DC voltage converter is known from U.S. Pat. No. 8,779,731 B2.

A DC-DC voltage converter with hysteretic control system is also known from U.S. Pat. No. 8,957,607 B2.

SUMMARY OF THE INVENTION

The invention is likewise based on a DC-DC voltage converter with such a hysteretic switch control system for a switching element for switching the coil current of the electrical coil.

A transistor, in particular a MOSFET (metal-oxide-semiconductor field-effect transistor) can be provided as switching element, for example. In this case, the coil current is monitored with respect to the current intensity thereof by virtue of a current measurement circuit being configured to generate a current measurement signal caused by the coil current or (in the case of likewise possible control of the input current) by an input current of the DC-DC voltage converter. Said hysteretic switch control system is configured to electrically turn off the switching element if the current measurement signal signals a coil current greater than said peak comparison value. The switch control system electrically turns the switching element back on only if the current measurement signal signals a coil current lower than the valley comparison value, which is (typically) lower than the peak comparison value.

An alternative to such a hysteretic switch control system is a controller that adjusts the electrical output variable of the DC-DC voltage converter directly to a setpoint value, that is to say does allow it to oscillate between two comparison values. This results in control of the electrical output variable directly to an average value. In the case of hysteretic control, in contrast, it must be ensured, proceeding from the comparison values, that the desired setpoint value results on average. For this purpose, the hysteretic switch control system has the advantage, however, that it is more robust with respect to fluctuations of the input voltage and reacts more quickly to a changing load.

The invention is based on the object of controlling an electrical output variable of a DC-DC voltage converter.

The object is achieved by means of the subjects of the independent patent claims. Advantageous developments of the invention are described by the dependent patent claims, the following description and the figures.

A first aspect of the invention relates to a DC-DC voltage converter, having:
 an electrical coil,
 a switching element for controlling an electric coil current of the coil,
 a current measurement circuit, which is configured to generate a current measurement signal correlated with the coil current or with an input current of the DC-DC voltage converter, and
 a hysteretic switch control system, which is configured to electrically turn off the switching element if the current measurement signal signals a coil current greater than a peak comparison value, and to electrically turn on the switching element if the current measurement signal signals a coil current lower than a valley comparison value.

In order to configure the described hysteretic switching, as carried out by the switch control system, to the extent that the coil current oscillates around a desired average value, that is to say is adjusted directly to the average value, the following is provided in accordance with this aspect of the invention. The output variable to be adjusted is measured by means of a measurement circuit, which is referred to as actual value measurement circuit here and which is configured to generate an actual value signal correlated with the electrical output variable, for example the output voltage or the output current or the output power. The present value of the output variable can thus be identified based on the actual value signal. The actual value measurement circuit is now coupled to the switch control system for the switching element not directly but instead a controller unit is connected in between. The controller unit is configured to adjust the output variable to a prescribed setpoint value. A comparison value signal for the switch control system can be generated depending on a control deviation of the actual value signal from the setpoint value. The controller unit thus does not control the switching element directly but instead only provides the downstream switch control system with a comparison value signal from which the switch control system then generates the two required comparison values, namely the peak comparison value and the valley comparison value.

The switch control system can be configured to generate the peak comparison value from the comparison value signal directly, that is to say to use the comparison value signal directly to specify the peak comparison value. The switch control system according to the mentioned aspect of the invention is configured to stipulate or set at least one average value of the peak comparison value based on the comparison value signal. This aspect of the invention is described in more detail below in connection with a spectral spread.

The switch control system sets the valley comparison value by virtue of it generating the valley comparison value from the comparison value signal by subtracting a ripple value. The ripple value thus specifies the amplitude or oscillation width by which the coil current oscillates between the peak comparison value and the valley comparison value. The peak comparison value and the valley comparison value are thus shifted or set indirectly by the controller unit by means of the comparison value signal in such a way that an average value of the output variable is leveled out or adjusted to the setpoint value.

The mentioned aspect of the invention produces the advantage that the output variable is adjusted to an average value by the controller unit and therefore does not inconveniently have to be converted back from peak current control to an average value. In this case, however, the control bandwidth of the hysteretic switching and the robustness with respect to fluctuations of the input voltage, as is produced by the hysteretic switching, are retained.

The DC-DC voltage converter can be designed in this case as a step-up converter or as a step-down converter.

As already stated, the switch control system can receive the comparison value signal from the controller unit and, in relation to the peak comparison value, form only one average value for the peak comparison value from the comparison value signal. In other words, the peak comparison value is given by a time signal that oscillates around the average value. This can be achieved by virtue of the switch control system being configured to combine the comparison value signal with an average-value-free spread signal of an AC voltage source, that is to say, for example, superposing said comparison value signal in an additive manner on the comparison value signal, and therefore generating the peak comparison value from the combined signal. The spread signal may be a sawtooth signal or a triangular-waveform signal or a sinusoidal signal, for example. As a result, the spectrum of the time profile of the coil current is spread. The electromagnetic compatibility (EMC) of the DC-DC voltage converter can thus be set or adjusted by means of the spread signal.

The invention also includes optional technical features that provide additional advantages.

In one embodiment, the controller unit is configured to identify the control deviation as the difference between the actual value signal and a prescribed reference signal.

The switch control system switches the switching element in order to switch the coil current as a result, and detects the actual current intensity of the coil current in the form of the described current measurement signal. Provision is preferably made for the switch control system to be configured to compare the current measurement signal with the peak comparison value on the one hand and the valley comparison value on the other hand by means of a respective comparator. As a result, it is possible to isolate the electrical potentials by virtue of potential-isolated amplifiers being used as comparators, for example.

The switching elements can then be controlled depending on a result of the output of the comparators. In this case, provision is preferably made for the switch control system to be interconnected with a control terminal or gate terminal of the switching element by means of an RS flip-flop. As a result, the two output signals of the comparators can be combined and be consolidated to form a single switching signal for the gate terminal of the switching element. The results of the respective comparison with the peak comparison value and the valley comparison value then represent an input signal for the set input and the reset input of the RS flip-flop.

Two further configurations of the invention relate to the generation of the current measurement signal. For this purpose, the current measurement circuit can be configured to generate the current measurement signal by means of a shunt resistor, that is to say an ohmic resistor element, through which the coil current flows. This makes it possible to measure the current intensity accurately. However, this measurement is subjected to losses.

In order to reduce the electrical losses, as an alternative thereto, the current measurement circuit is configured to generate the current measurement signal by means of an RC element circuit connected in parallel with the coil or at least bypassing the coil. Said circuit has a series circuit composed of an ohmic resistor element R and an electrical capacitance C. The voltage dropped across the capacitance C then likewise represents a suitable current measurement signal.

In relation to the controller unit, one embodiment makes provision for said controller unit to be configured to generate said comparison value signal for the switch control system from said control deviation by means of a PID (proportional integral differential) controller.

The switch control system generates the peak comparison value from the comparison value signal in the described manner. In order to also generate the valley comparison value from the comparison value signal, the ripple value is preferably superposed on the comparison value by virtue of a signal output, which signals the comparison value signal, of the controller unit being coupled to a comparator input of the switch control system by means of an additional circuit, which provides a ripple DC voltage source for the additive superposition of the ripple DC voltage. As an alternative thereto, a voltage divider is provided, which can likewise be used to provide or implement subtraction of a ripple value in terms of circuitry technology.

As an alternative to such circuitry embodiments, the invention also comprises a digital embodiment or configuration by virtue of the controller unit and the switch control system being provided by way of a digital processor device. This is possible on account of the described combination of controller unit and switch control system according to the invention. Said RS flip-flop can also be subsequently programmed or subsequently designed by way of a digital equivalent. The processor device can be provided on the basis of a microcontroller or an ASIC (application-specific integrated circuit).

Operating a DC-DC voltage converter according to one of the mentioned embodiments produces a method according to a further aspect of the invention.

In other words, a current measurement circuit generates a current measurement signal that correlates with a coil current of the coil of the DC-DC voltage converter or with an input current of the DC-DC voltage converter or is brought about thereby. A hysteretic switch control system switches off the coil current by means of the switching element, that is to say, for example, by means of a transistor, that is to say electrically turns off the switching element if the current measurement signal signals a coil current greater than the peak comparison value. In contrast, the switch control system electrically turns the switching element on if the current measurement signal signals a coil current lower than the valley comparison value, which is lower than the peak comparison value. To set the peak comparison value and the valley comparison value, provision is made for these to be varied or set in such a way that the coil current oscillates around a settable or desired average value in such a way that a resulting average value of the electrical output variable of the DC-DC voltage converter to be adjusted oscillates around a settable setpoint value. The output variable may be the output voltage or the output current or the output power. Said actual value measurement circuit generates the actual value signal correlated with the electrical output variable, from which actual value signal the controller unit then identifies the control deviation from the setpoint value in order to provide the comparison value signal for the hysteretic switch control system. The controller unit thus adjusts the output variable of the DC-DC voltage converter to the prescribed setpoint value indirectly by means of the comparison value.

For this purpose, the switch control system is controlled by the controller unit by means of the comparison value signal, wherein the switch control system on the one hand sets an average value of the peak comparison value from the comparison value and on the other hand generates the valley comparison value from the comparison value signal by subtracting a ripple value, wherein the switch control system combines the comparison value signal with an average-value-free spread signal of an AC voltage source and generates from the combined signal the peak comparison value, with the result that the peak comparison value is given by a time signal that oscillates around an average value.

The invention also includes developments of the method according to the invention having features as have already been described in connection with the developments of the DC-DC voltage converter according to the invention. For this reason, the corresponding developments of the method according to the invention are not described here again.

Exemplary embodiments of the invention are described below. To that end, in the figures:

DESCRIPTION OF THE INVENTION

The exemplary embodiments discussed below are preferred embodiments of the invention. In the exemplary embodiments, the described components of the embodiments each represent individual features of the invention which are to be considered independently of one another, which each also refine the invention independently of one another and are therefore also to be considered to be a component of the invention individually or in a combination other than that shown. Furthermore, the described embodiments may also be supplemented by further features of the invention that have already been described.

In the figures, functionally identical elements are provided with the same reference signs in each case.

Figure 1:
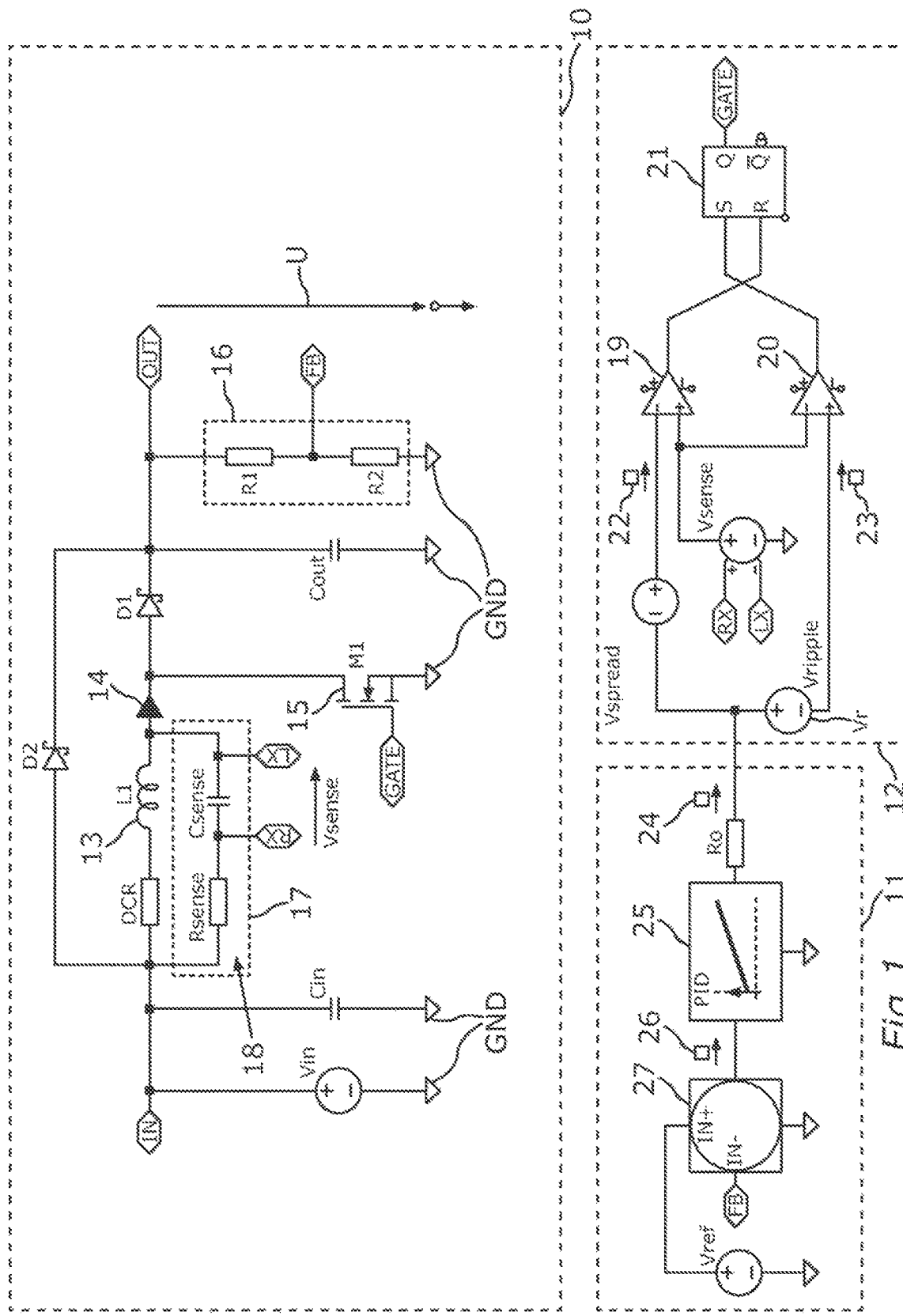
FIG. 1 shows a schematic illustration of a first embodiment of the DC-DC voltage converter according to the invention having an RC element circuit for current measurement.

FIG. 1 shows a DC-DC voltage converter 10, which is configured as a step-up converter (boost converter). In FIG. 1, a controller unit 11 and a switch control system 12 are shown separately for the sake of simplicity. The connection to the other elements of the DC-DC voltage converter 10 is illustrated by corresponding signal flags or signal transitions.

The DC-DC voltage converter 10 can be provided, for example, in a motor vehicle. For example, an electric current through a light-emitting diode or through a series circuit composed of light-emitting diodes can be controlled by means of the DC-DC voltage converter 10.

The DC-DC voltage converter 10 can have an electrical coil 13 with an inductance value L1, which coil can have an ohmic resistance value DCR. A switching element 15 can be provided to switch or set a coil current 14 through the coil 13, said switching element being able to be designed here as a transistor M1, for example as a MOSFET. When the switching element 15 is turned off, the coil current 14 is conducted through a rectifying diode D1 to an output OUT of the DC-DC voltage converter 10.

The DC-DC voltage converter 10 can receive the coil current 14 from a voltage source Vin via an input IN. A smoothing capacitor Cin can be provided at the input IN to smooth the input voltage. In the case of the DC-DC voltage converter 10, circuits can be closed by means of a ground potential GND.

An output voltage U of the DC-DC voltage converter 10 can be smoothed by means of a smoothing capacitor Cout, which couples the output OUT to the ground potential GND. The DC-DC voltage converter 10 can furthermore have a diode D2 for bypassing the coil 13. The diode D2 serves to divert the inrush current or precharging current for the smoothing capacitor Cout and to prevent it flowing through the coil L1.

A voltage value of the output voltage U can be detected by means of an actual value measurement circuit 16, which may be formed at the output OUT, for example, by a voltage divider composed of resistor elements R1, R2. The actual value measurement circuit 16 generates an actual value signal FB.

The output voltage U may be a controlled output variable. A current intensity of the coil current 14 can be measured for this purpose by means of a current measurement circuit 17, which, in the example shown, may be formed from an RC element circuit 18 composed of a resistor element Rsense and a capacitor Csense. A voltage that represents a current measurement signal Vsense is dropped across the capacitor Csense depending on a current intensity of the coil current 14. The RC element circuit 18 bypasses the coil 13; said RC element circuit is thus not connected upstream or downstream of the coil 13, with the result that low-loss current measurement is possible.

The switching element 15 can be switched by means of a gate input GATE in order to switch the switching element 15 between an electrically on and an electrically off state as a result.

To generate a switching signal for the gate terminal GATE, said gate terminal can be interconnected with the hysteretic switch control system 12 by virtue of comparators 19, 20 being able to be interconnected by way of the comparator outputs thereof with the gate terminal GATE by means of an RS flip-flop 21. The comparator 19 can compare the current measurement signal Vsense with a peak comparison value 22 and signal if the current measurement signal Vsense is greater than the peak comparison value 22. As a result, the flip-flop 21 is reset at the reset input R and the switching element 15 is therefore electrically turned off. The comparator 20 can carry out a comparison of the current measurement signal Vsense with a valley comparison value 23 and signal if the current measurement signal Vsense is lower than the valley comparison value 23, as a result of which the set input S of the flip-flop is set and the switching element 15 is therefore switched to an electrically on state.

In connection with the switch control system 12, the current measurement signal Vsense is represented symbolically as a voltage source.

The peak comparison value 22 can be generated from a comparison value signal 24, which the controller unit 11 can generate at a signal output Ro in the manner described below. To this end, the comparison value signal 24 can be used directly as peak comparison value 22 at a comparator input of the comparator 19. As an alternative thereto, an average-value-free spread signal Vspread can be superposed in an additive manner on the comparison value signal 24, which is effected according to FIG. 1 by way of a voltage source circuit, which may be based on a transistor.

The valley comparison value 23 can be generated from the comparison value signal 24 by means of a ripple value Vripple, which can be superposed in an additive manner on the comparison value signal 24. The ripple value can be applied by means of a ripple DC voltage source Vr, which may be formed, for example, based on a transistor circuit.

The comparison value signal 24 can be generated by the controller unit 11 on the basis of PID control by means of a PID controller 25. Said PID controller receives a control deviation 26, which corresponds to a difference between the actual value signal FB and a setpoint value Vref. The setpoint value Vref is represented symbolically by a voltage source, which constitutes an electrical setpoint value signal. The control deviation 26 can be identified by means of a subtractor 27.

Figure 2:
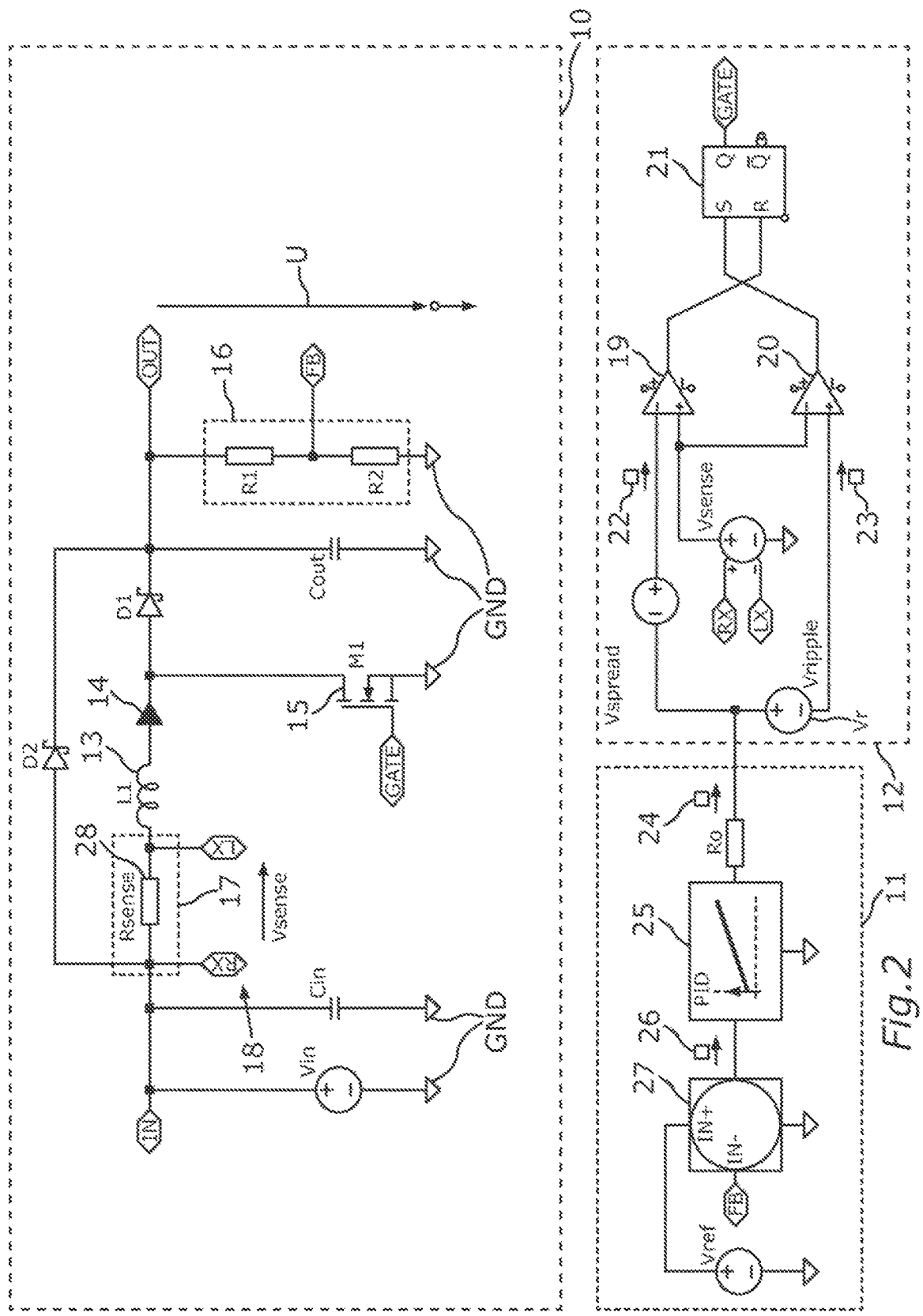
FIG. 2 shows a schematic illustration of a second embodiment of the DC-DC voltage converter according to the invention having a shunt resistor for current measurement.

FIG. 2 describes a DC-DC voltage converter 10, which can be constructed or designed like the DC-DC voltage converter 10 of FIG. 1 and only has the differences described in the following text.

Instead of the RC element circuit 18, a shunt resistor 28 with a resistance value Rsense can be connected in series with the coil 13 as a current measurement circuit 17 for generating the current measurement signal Vsense.

Figure 3:
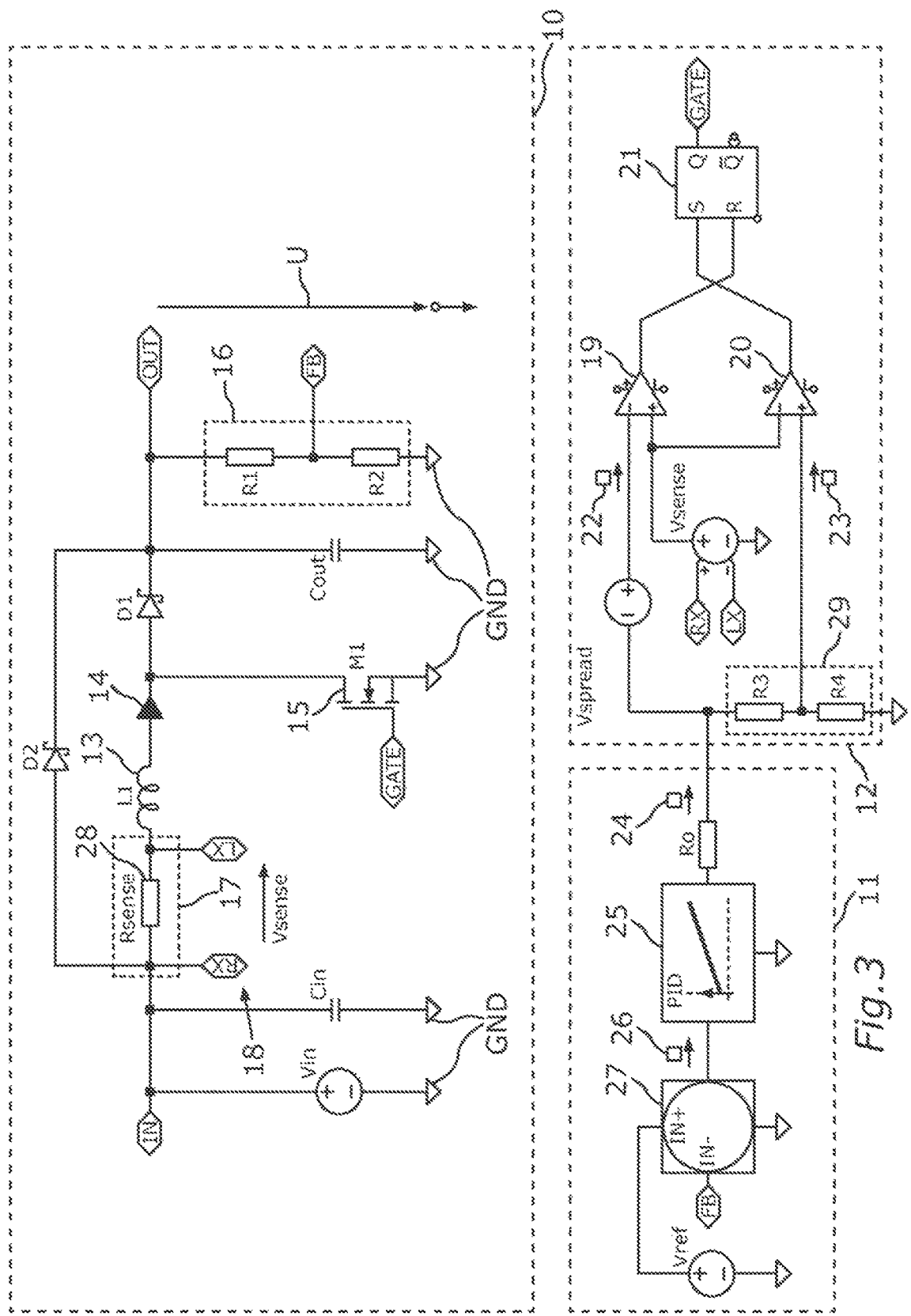
FIG. 3 shows a schematic illustration of a third embodiment of the DC-DC voltage converter according to the invention having a voltage divider for providing a ripple value.

FIG. 3 illustrates a DC-DC voltage converter 10, which can be designed like the DC-DC voltage converter 10 of FIG. 2 and is distinguished by the following differences.

To apply the ripple value Vripple to the comparison value signal 24, a voltage divider 29 is provided instead of a DC voltage source Vr, by means of which voltage divider a reduced signal or a signal reduced by the ripple value Vripple is generated from the comparison value signal 24 as a voltage signal in order to provide the valley comparison value 23. The voltage divider 29 can be formed from resistor elements R3, R4.

Until this point, only step-up converters have been described.

Figure 4:
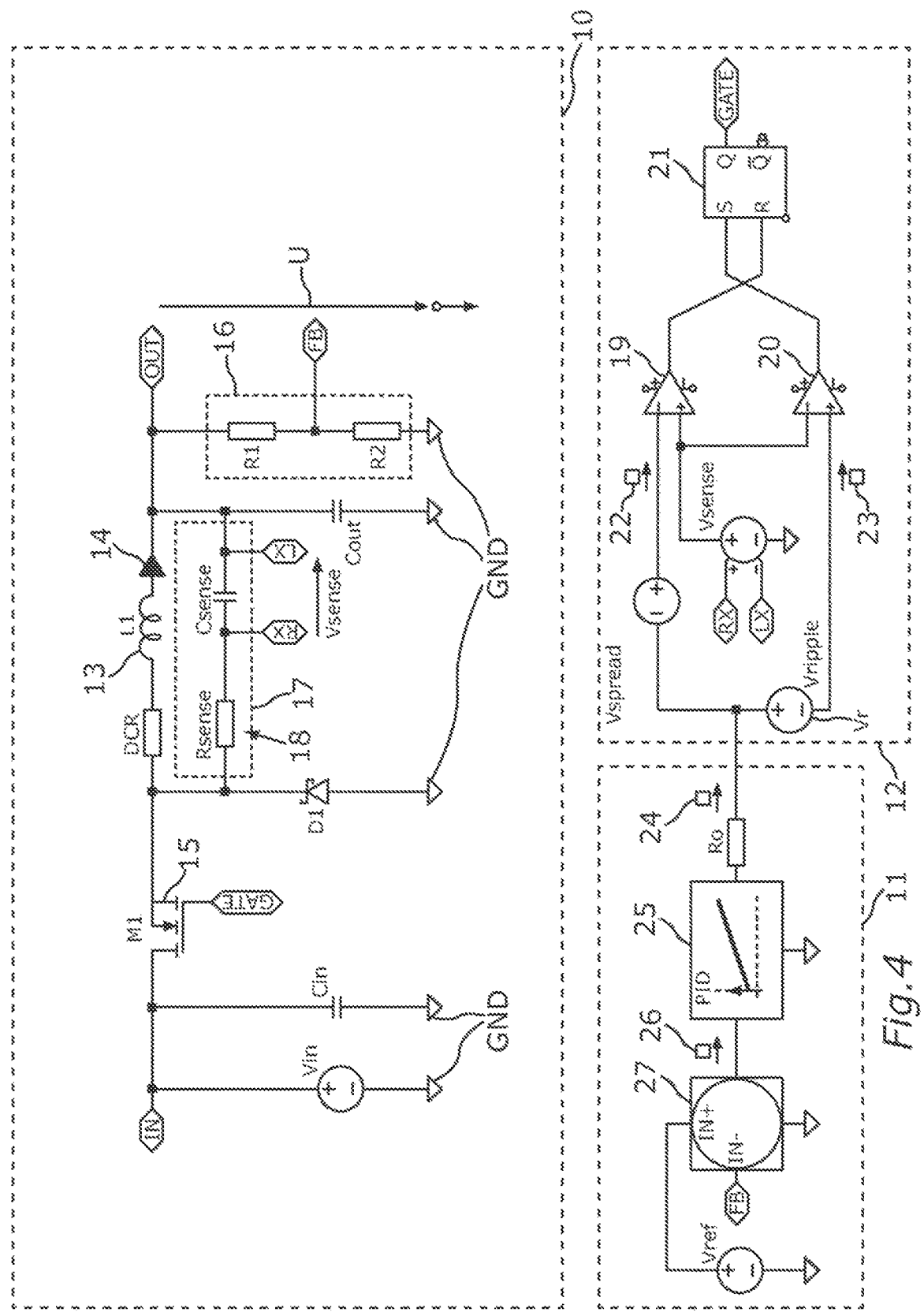
FIG. 4 shows a schematic illustration of a fourth embodiment of the DC-DC voltage converter according to the invention that provides step-down conversion (buck converter).

FIG. 4 illustrates an embodiment of the DC-DC voltage converter 10 that produces step-down conversion (buck converter). A combination of the controller unit 11 and the switch control system 12 can also be used or provided for this purpose in the described manner.

In general, the DC-DC voltage converter 10 can also be configured as follows.

The voltage of the current measurement signal Vsense between the nodes RX and LX is conducted to the comparators 19, 20 (capable of high-input common-mode) for peak and valley detection either indirectly, for example by way of a high-side measurement amplifier with high common-mode input voltage, or directly. This can be imagined such that it constitutes an idealized potential-isolated amplifier for the voltage applied to Csense. The peak and valley comparators actuate the RS trigger, which in turn actuates the switch M1.

Vspread results in the hysteresis band varying and therefore the switching frequency of M1 being modulated in time with the voltage Vspread. With an appropriate design, a spread spectrum modulation of the converter switching frequency can therefore be produced.

The specification for the peak current in the inductor L1 comes from a PID (proportional-integral-derivative) controller, which always attempts to bring the deviation between the actual variable (in this case the output voltage U, divided down by the voltage divider R1/R2) and the setpoint value, that is to say the reference voltage Vref, to zero.

The control concept of the proposed converter can now be seen: By stipulating the coil current ripple and thus the average value of the coil current as a function of the output voltage, said converter makes it possible to perform rapid and precise average-mode control, in boost as well as buck configuration.

In contrast to the peak-current-mode control, it is not the peak value of the coil current but the average value of the coil current that is controlled. The switching frequency is variable here.

A further advantageous embodiment of the proposed DC-DC voltage converter omits the voltage source Vripple and instead makes use of the voltage divider Ro/R3/R4 for the stipulation of the coil ripple current. In this case, the coil ripple is no longer constant but variable and contingent on the voltage drop at the resistor R4.

Advantages of the shown features of the DC-DC voltage converter are:

1. High control speed:

The high speed is produced by the lack of compensation network for the hysteretic part of the controller and the omission of slope compensation.

2. Controlled coil current

The two hysteretic comparators for the peak and valley current determine the ripple current in the converter coil. They can therefore be protected against saturation or high ripple current losses.

3. Stability without slope compensation

What is known as slope compensation is not necessary in average-mode control (average value control).

4. Spread Spectrum

A spread-spectrum modulation method for minimizing the peak detector values, which is advantageous in terms of EMC, is possible in a very simple manner owing to the addition of an additional AC voltage source in the peak comparator.

5. Loss-free current measurement possible

Instead of a measurement shunt for the coil current, an RC element can be interconnected in parallel with the coil. The voltage drop at the capacitor is measured.

6. High accuracy

By using the two control loops, PID and hysteretic, a high accuracy is achieved like in the conventional peak-current-mode controller.

7. Cost efficiency

The proposed converter topology is very cost-efficient owing to the omission of a slope compensation network and possibly the use of the RC network for coil current measurement.

8. Compatibility with digital technology

The implementation of the controller in the digital domain (digital PID controller, flip-flop and optionally an analog-to-digital converter for the comparators) is very easily possible owing to the omission of the slope compensation.

9. Suitable for controlling the average value of the input current

Given a corresponding design of the proposed converter (current measurement circuit at the input), average value control of the input current, for example in the boost converter configuration, is also possible, as required, for example, in the solar MPPT (maximum power point tracking) converters.

Overall, the example shows how combined hysteretic and PID-based control for a DC-DC voltage converter can be provided by the invention.

LIST OF REFERENCE SIGNS

10 DC-DC voltage converter
11 Controller unit
12 Switch control system
13 Coil
14 Coil current
15 Switching element
16 Actual value measurement circuit
17 Current measurement circuit
18 RC element circuit
19 Comparator
20 Comparator
21 Flip-flop
22 Peak comparison value
23 Valley comparison value
24 Comparison value signal
25 PID controller
26 Control deviation
27 Subtractor
28 Shunt resistor
Vsense Current measurement signal
FB Actual value signal
Vripple Ripple value

The invention claimed is:

1. A DC-DC voltage converter, comprising:
an electrical coil;
a switch for controlling an electric coil current of said coil;
a current measurement circuit configured to generate a current measurement signal correlated with the coil current or with an input current of the DC-DC voltage converter;
a hysteretic switch control system configured to electrically turn off said switch if the current measurement signal signals the coil current is greater than a peak comparison value, and to electrically turn on said switch if the current measurement signal signals the coil current is lower than a valley comparison value;
an actual value measurement circuit configured to generate an actual value signal correlated with an electrical output variable of the DC-DC voltage converter;
a controller configured to adjust the electrical output variable to a prescribed setpoint value and to generate a comparison value signal for said hysteretic switch control system depending on a control deviation;
said hysteretic switch control system being configured to set an average value of the peak comparison value from the comparison value signal and to generate the valley comparison value from the comparison value signal by subtracting a ripple value;
an AC voltage source outputting an average-value-free spread signal; and
said hysteretic switch control system being configured to generate the peak comparison value by combining the comparison value signal with the average-value-free spread signal of said AC voltage source, with a result that the peak comparison value is given by a time signal that oscillates around the average value.

2. The DC-DC voltage converter as claimed in claim 1, wherein said controller is configured to identify the control deviation as a difference between the actual value signal and a prescribed reference signal.

3. The DC-DC voltage converter according to claim 1, wherein said hysteretic switch control system has a comparator and is configured to compare the current measurement signal with the peak comparison value and the valley comparison value by means of said comparator.

4. The DC-DC voltage converter according to claim 1, wherein:
said switch has a gate terminal; and
said hysteretic switch control system has an RS flip-flop and is interconnected with said gate terminal of said switch by means of said RS flip-flop.

5. The DC-DC voltage converter according to claim 1, wherein said current measurement circuit has a shunt resistor and is configured to generate the current measurement signal by means of said shunt resistor through which the coil current flows.

6. The DC-DC voltage converter according to claim 1, wherein said current measurement circuit has an RC element circuit and is configured to generate the current measurement signal by means of said RC element circuit connected in parallel with said coil or bypassing said coil.

7. The DC-DC voltage converter according to claim 1, wherein said controller has a proportional-integral-derivative (PID) controller and is configured to generate the comparison value signal from the control deviation by means of said PID controller.

8. The DC-DC voltage converter according to claim 1, wherein:
said hysteretic switch control system has a comparator input;
said hysteretic switch control system has a ripple DC voltage source or a voltage divider; and
said hysteretic switch control system is configured to superimpose the ripple value on the comparison value signal by virtue of a signal output, which signals the comparison value signal, of said controller being interconnected with said comparator input of said hysteretic switch control system by means of said ripple DC voltage source or by means of said voltage divider.

9. . The DC-DC voltage converter according to claim 1, wherein said controller and said hysteretic switch control system are provided by a digital processor device.

10. A method for operating a DC-DC voltage converter, which comprises the steps of:
generating, via a current measurement circuit, a current measurement signal correlated with a coil current of a coil of the DC-DC voltage converter or with an input current of the DC-DC voltage converter;
electrically turning off a switch provided to control the coil current via a hysteretic switch control system, if the current measurement signal signals the coil current being greater than a peak comparison value, and electrically turning on the switch element if the current measurement signal signals the coil current being lower than a valley comparison value;
generating, via an actual value measurement circuit, an actual value signal correlated with an electrical output variable of the DC-DC voltage converter;

adjusting, via a controller, the electrical output variable to a prescribed setpoint value and generating a comparison value signal depending on a control deviation; and setting, via the hysteretic switch control system, an average value of the peak comparison value from the comparison value signal and generating the valley comparison value from the comparison value signal by subtracting a ripple value, wherein the hysteretic switch control system generates the peak comparison value by combining the comparison value signal with an average-value-free spread signal of an AC voltage source, with a result that the peak comparison value is given by a time signal that oscillates around the average value.

\* \* \* \* \*